(12) United States Patent
Kamiyama et al.

(10) Patent No.: US 9,158,040 B2
(45) Date of Patent: Oct. 13, 2015

(54) ANTI-REFLECTION ARTICLE

(71) Applicant: DAI NIPPON PRINTING CO., LTD., Tokyo (JP)

(72) Inventors: Hironori Kamiyama, Tokyo (JP); Toshiaki Satou, Tokyo (JP); Minoru Yamamoto, Tokyo (JP); Tsukasa Ayuzawa, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 14/358,879

(22) PCT Filed: Sep. 27, 2013

(86) PCT No.: PCT/JP2013/076341
§ 371 (c)(1),
(2) Date: May 16, 2014

(87) PCT Pub. No.: WO2014/051082
PCT Pub. Date: Apr. 3, 2014

(65) Prior Publication Data
US 2014/0320970 A1    Oct. 30, 2014

(30) Foreign Application Priority Data
Sep. 28, 2012  (JP) .................. 2012-217744

(51) Int. Cl.
*G02B 27/00* (2006.01)
*G02B 1/118* (2015.01)
*B29C 59/02* (2006.01)

(52) U.S. Cl.
CPC .............. *G02B 1/118* (2013.01); *B29C 59/022* (2013.01); *B29C 2059/023* (2013.01)

(58) Field of Classification Search
CPC ........ G02B 5/02; G02B 5/021; G02B 5/0215; G02B 5/0221; G02B 5/0231; G02B 5/0247; G02B 5/0252; G02B 1/11; G02B 1/111; G02B 1/113; G02B 1/118; G01B 1/10
See application file for complete search history.

(56) References Cited

U.S. PATENT DOCUMENTS

| 7,939,160 B2 * | 5/2011 | Furuya et al. ............... 428/141 |
| 2005/0063066 A1 | 3/2005 | Namioka et al. |

(Continued)

FOREIGN PATENT DOCUMENTS

| JP | A-2001-272505 | 10/2001 |
| JP | A-2001-517319 | 10/2001 |

(Continued)

OTHER PUBLICATIONS

Jul. 2, 2013 Office Action issued in Japanese Patent Application No. 2012-217744.

(Continued)

*Primary Examiner* — Scott J Sugarman
*Assistant Examiner* — Robert E Tallman
(74) *Attorney, Agent, or Firm* — Oliff PLC

(57) ABSTRACT

To provide an anti-reflection article which can be manufactured by using an anti-reflection article manufacturing mold plate having improved abrasion resistance compared to the related art and has a sufficient anti-reflection property. An anti-reflection article is formed as an anti-reflection article in which minute concave portions are densely arranged and the gap between the adjacent minute concave portions is the shortest wavelength of a wavelength band or less of an electromagnetic wave for anti-reflection. In the anti-reflection article, at least some of the minute concave portions are a minute concave portion with multiple lowermost points in the minute concave portion.

12 Claims, 7 Drawing Sheets

(56) References Cited

U.S. PATENT DOCUMENTS

| | | |
|---|---|---|
| 2007/0139783 A1 | 6/2007 | Furuya et al. |
| 2007/0159698 A1 | 7/2007 | Taguchi et al. |
| 2008/0130123 A1 | 6/2008 | Namioka et al. |
| 2011/0102900 A1 | 5/2011 | Hayashibe et al. |
| 2011/0267698 A1* | 11/2011 | Guilfoyle et al. ............ 359/609 |

FOREIGN PATENT DOCUMENTS

| | | |
|---|---|---|
| JP | A-2002-286906 | 10/2002 |
| JP | A-2003-053867 | 2/2003 |
| JP | A-2004-205990 | 7/2004 |
| JP | A-2004-287238 | 10/2004 |
| JP | A-2005-092197 | 4/2005 |
| JP | A-2005-156695 | 6/2005 |
| JP | A-2007-127855 | 5/2007 |
| JP | A-2007-156132 | 6/2007 |
| JP | A-2008-090212 | 4/2008 |
| JP | A-2010-237419 | 10/2010 |
| JP | A-2011-107195 | 6/2011 |
| JP | A-2012-014083 | 1/2012 |
| JP | A-2012-014084 | 1/2012 |
| WO | WO 2006/059686 A1 | 6/2006 |
| WO | WO 2010/008091 A1 | 1/2010 |

OTHER PUBLICATIONS

Nov. 12, 2013 Office Action issued in Japanese Patent Application No. 2012-217744.

May 9, 2014 Office Action issued in Korean Patent Application No. 10-2014-7010665.

Nov. 12, 2013 Office Action issued in Japanese Patent Application No. 2012-217744 (with translation).

* cited by examiner (A)

(B)

(C)

(D)

ANTI-REFLECTION ARTICLE

TECHNICAL FIELD

The present invention relates to an anti-reflection article that exhibits an anti-reflection function by the dense arrangement of a plurality of minute convex portions with a gap of the shortest wavelength of a wavelength band or less of an electromagnetic wave for anti-reflection.

BACKGROUND ART

In recent years, various methods have been proposed for manufacturing an anti-reflection film as a film-shaped anti-reflection article by densely arranging a plurality of minute convex portions on the surface of a transparent base (transparent film) for an anti-reflection function (see Patent Documents 1 to 6). In these methods, the principle of a so-called moth eye structure is used. Specifically, the refractive index of incident light is continuously changed in the thickness direction of a substrate so as to remove a non-continuous boundary face for the refractive index, and hence an anti-reflection function is obtained.

In general, such a moth eye structure is manufactured by transferring (molding) an uneven surface shape in an arbitrary resin layer using a manufacturing mold plate such as a mold having a shape in which a minute uneven surface shape with a plurality of minute convex portions is reversed. Accordingly, as a method of manufacturing the anti-reflection film with the moth eye structure, a method may be used in which a resin layer is formed on a substrate by a curable base such as an ultraviolet curable resin, a moth eye structure is molded in the surface of the resin layer by using the above-described manufacturing mold plate, and the resin layer is cured. According to such a manufacturing method, it is possible to continuously manufacture an anti-reflection film by a simple method and with high efficiency.

Furthermore, as the mold plate of the moth eye structure, a mold (for example, see Patent Documents 1 to 3) having a concave portion formed by laser interferometry or a mold (for example, see Patent Documents 4 to 6) having a concave portion formed by an anodization method is used. Among these, since the anodization method has advantages in which a concave portion forming position may be set randomly and the concave portion may be formed with a uniform shape over a large area, the mold plate formed by the anodization method is widely used as the anti-reflection article manufacturing mold plate.

It is desirable to manufacture the anti-reflection article with high efficiency according to a roll-to-roll process by using a so-called roll plate a peripheral surface of which is provided with an uneven surface shape provided to mold the moth eye structure as a mold plate. Thus, various methods of manufacturing an anti-reflection article by using such a roll plate are proposed (see Patent Document 7).

Incidentally, there is a case in which the properties of the anti-reflection article are degraded due to the degradation of the roll plate used for the manufacturing process for a long period of time. The present inventor has carefully examined this drawback, and has found that some defects occur in certain points or areas of the roll plate because the molded minute uneven structure adheres to the resin layer provided for the molding process and is partially peeled off from the mold when the minute uneven structure is peeled off after the mold.

When the mold is degraded, there is a need to manufacture a mold having the same minute uneven structure as that of the mold without any degradation and to replace the old mold with new one. As a method of reducing the high cost spent for exchanging the mold, Patent Document 2 discloses a method in which a replicative mold (master die) manufactured by a replicating process of obtaining and reversing the minute uneven surface shape once or at least twice is used as the mold used to mold the moth eye structure instead of the original mold (mother die) having the minute uneven surface shape formed thereon on the first occasion. Since the master die of the mold may be easily manufactured again from the mother die, this method is excellent from the viewpoint of industrial productivity and cost, and hence the mold may be easily replaced when the mold is degraded.

However, even when the mold is, for example, a resinous mold plate, if such an anti-reflection article manufacturing mold plate is manufactured again for the replacement of the mold whenever slight degradation occurs, the replacement still causes a large increase in the running cost of the anti-reflection film manufacturing line in spite of the above-described method contrived by the examination. For this reason, there has been a demand for a new method for reducing the running cost of the entire manufacturing line.

[Patent Document 1] Japanese Unexamined Patent Application (Translation of PCT Application), Publication No. 2001-517319

[Patent Document 2] Japanese Unexamined Patent Application, Publication No. 2004-205990

[Patent Document 3] Japanese Unexamined Patent Application, Publication No. 2004-287238

[Patent Document 4] Japanese Unexamined Patent Application, Publication No. 2001-272505

[Patent Document 5] Japanese Unexamined Patent Application, Publication No. 2002-286906

[Patent Document 6] Pamphlet of PCT International Publication No. WO2006/059686

[Patent Document 7] Japanese Unexamined Patent Application, Publication No. 2005-156695

DISCLOSURE OF THE INVENTION

Problems to be Solved by the Invention

The present invention is made in view of such circumstances, and an object of the present invention is to provide an anti-reflection article which can be manufactured by using an anti-reflection article manufacturing mold plate having improved abrasion resistance compared to the related art and has a sufficient anti-reflection property.

Means for Solving the Problems

The present inventor has repeated a careful examination in order to solve the above-described problems and has found that a sufficient anti-reflection property can be achieved even in the case of a general shape of the related art in which a concave portion of the uneven surface shape of an anti-reflection surface is inverted to a minute convex portion, and the abrasion resistance of the mold plate can be improved by forming the shape of the anti-reflection surface to correspond to such an uneven surface shape and to have a minute concave portion having multiple lowermost points (multi-groove minute concave portion). As a result, the present invention was completed. Incidentally, hereinafter, the minute concave portion having only one lowermost point is referred to as a single-groove minute concave portion in comparison with the multi-groove minute concave portion. Furthermore, each concave portion forming each lowermost point relating to the multi-groove minute concave portion and the single-groove minute convex portion is appropriately referred to as a groove.

Specifically, the present invention provides the following techniques.

(1) An anti-reflection article in which minute concave portions are densely arranged and a gap between the adjacent minute concave portions is the shortest wavelength of a wavelength band or less of an electromagnetic wave for anti-reflection, wherein at least some of the minute concave portions are a minute concave portion with multiple lowermost points in the minute concave portion.

According to (1), it is possible to provide the anti-reflection article which can be manufactured by using an anti-reflection article manufacturing mold plate having improved abrasion resistance compared to the related art and has a sufficient anti-reflection property.

(2) The anti-reflection article described in (1), wherein a standard deviation of the depths of the minute concave portions varies in a range of 10 nm or more and 50 nm or less.

According to (2), it is possible to further improve the abrasion resistance of the anti-reflection article manufacturing mold plate.

(3) The anti-reflection article described in (1) or (2), wherein at least some of the minute concave portions form an annular minute concave portion group which is formed by an inner-core minute concave portion and a plurality of outer-edge minute concave portions that are formed by surrounding the circumference of the inner-core minute concave portion and have a deeper depth than that of the inner-core minute concave portion.

According to (3), it is possible to further improve the abrasion resistance of the anti-reflection article manufacturing mold plate.

(4) The anti-reflection article described in (3), wherein a proportion of the minute concave portions forming the annular minute concave portion group among the minute concave portions is 7% or higher.

According to (4), the effect of improving the abrasion resistance of the anti-reflection article manufacturing mold plate is exhibited more stably.

(5) The anti-reflection article described in (1) or (2), wherein at least some of the minute concave portions form an earthenware mortar-shaped minute concave portion group which is formed by one central minute concave portion and a plurality of peripheral minute concave portions that are formed adjacent to the circumference of the central minute concave portion and have a shallower depth than that of the central minute concave portion.

According to (5), it is possible to further improve the abrasion resistance of the anti-reflection article manufacturing mold plate.

(6) The anti-reflection article described in (5), wherein a proportion of the minute concave portions forming the earthenware mortar-shaped minute concave portion group among the minute concave portions is 10% or higher.

According to (6), it is possible to further and more reliably improve the abrasion resistance of the anti-reflection article manufacturing mold plate.

(7) The anti-reflection article described in any one of (1) to (6), wherein the minute concave portions are arranged in a non-matrix form in planar view, and wherein, in at least a partial area of the anti-reflection article, a net-like parting line formed by surrounding each minute concave portion on a ridge portion between respective adjacent minute concave portions matches a Voronoi tessellation line having a centroid point on each minute concave portion in planar view as a generating point.

According to (7), it is possible to further improve the abrasion resistance of the anti-reflection article manufacturing mold plate.

(8) The anti-reflection article described in (7), wherein, in 20% or more of an area on a surface of the anti-reflection article, the net-like parting line matches the Voronoi tessellation line.

According to (8), the effect of improving the abrasion resistance of the anti-reflection article manufacturing mold plate is exhibited more stably.

(9) The anti-reflection article described in (7) or (8), in which, in the net-like parting line matching the Voronoi tessellation line, an average number of the Voronoi tessellation lines each having a Voronoi branch point as a starting point is 3 or more and less than 4.

According to (9), the effect of improving the abrasion resistance of the anti-reflection article manufacturing mold plate is exhibited more stably.

(10) An anti-reflection article manufacturing mold plate in which minute convex portions corresponding to the minute concave portions of the anti-reflection article described in any one of (1) to (9) are densely formed.

According to (10), it is possible to manufacture the anti-reflection article having a sufficient anti-reflection property by using the anti-reflection article manufacturing mold plate having an improved abrasion resistance compared to the related art.

(11) An image display apparatus in which the anti-reflection article according to any one of (1) to (9) is applied onto a light emission surface of an image display panel.

According to (11), it is possible to provide the image display apparatus using the anti-reflection article that is manufactured by using the anti-reflection article manufacturing mold plate having an improved abrasion resistance.

(12) A method of manufacturing the anti-reflection article according to any one of (1) to (9), the method including: molding a plurality of minute concave portions in a surface of a curable base by causing an anti-reflection surface of an anti-reflection article for another original plate which is provided with the anti-reflection surface formed by densely arranging minute convex portions on a transparent base to come into pressure-contact with the surface of the uncured curable base; curing the uncured curable base in which the minute concave portion is molded; and causing the anti-reflection article for the another original plate to be peeled off from the curable base.

According to (12), since an existing anti-reflection article can be used as the anti-reflection article manufacturing mold plate having an improved abrasion resistance, it is possible to improve productivity of the anti-reflection article.

Effects of the Invention

It is possible to provide the anti-reflection article which can suppress the degradation of the mold plate for molding the moth eye structure and has a sufficient anti-reflection property.

EXPLANATION OF REFERENCE NUMERALS

1 ANTI-REFLECTION ARTICLE
2 BASE
3 ANTI-REFLECTION SURFACE
4 CURABLE BASE
5 ANTI-REFLECTION ARTICLE MANUFACTURING MOLD PLATE
6 ANNULAR MINUTE CONCAVE PORTION GROUP
61, 62, 63, 64, 65 MINUTE CONCAVE PORTION
60 BOWL-SHAPED MINUTE CONCAVE PORTION GROUP
7 PRESSURE ROLLER

PREFERRED MODE FOR CARRYING OUT THE INVENTION

Anti-Reflection Article

Figure 1:
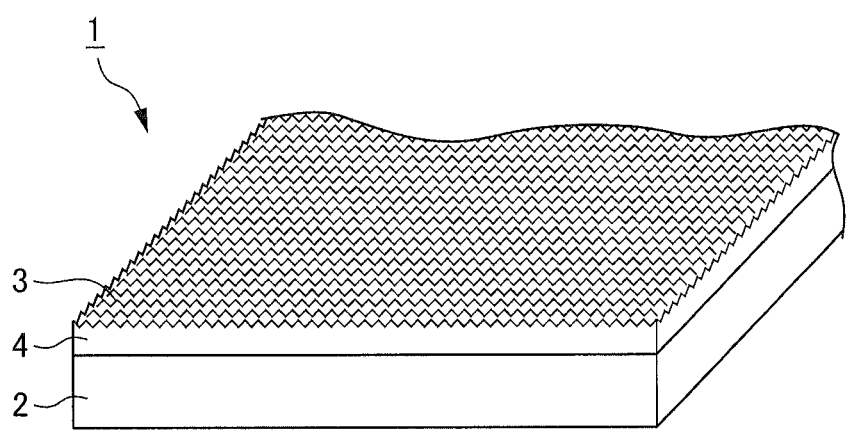
FIG. 1 is a conceptual perspective view that is provided to describe the anti-reflection article of the present invention.

FIG. 1 is a diagram schematically illustrating the configuration of an anti-reflection article 1 that is the anti-reflection article of the present invention. The anti-reflection article 1 has a configuration in which the surface of a base 2 is provided with an anti-reflection surface 3 that is obtained by forming a moth eye structure with a minute uneven surface shape in a curable base 4 such as an ultraviolet curable resin.

Furthermore, the shape of the anti-reflection article is not limited to a flat film shape, and may be formed in a flat sheet shape or a flat plate shape (film, sheet, and plate are designated separately based on the order of relative thickness). Furthermore, the film shape, the sheet shape, and the plate shape may have a curved shape or a cubic shape instead of the flat shape. Moreover, a cubic shape, such as various lenses and various prisms, may be appropriately employed in accordance with the application example.

The base 2 may use a film of a cellulose (fiber) resin such as triacetylcellulose (TAC), an acrylic resin such as polymethyl methacrylate (PMMA), a polyester resin such as polyethylene terephthalate (PET), a polyolefin resin such as polypropylene (PP), a vinyl resin such as polyvinyl chloride (PVC), and various transparent resins such as polycarbonate (PC). Furthermore, since the shape of the anti-reflection article is not limited to the film shape and may be various shapes, the base 2 may be formed of, for example, glass such as soda glass, potash glass, or lead glass, ceramics such as PLZT, or various transparent inorganic materials such as quartz and fluorite other than these materials in accordance with the shape of the anti-reflection article.

The anti-reflection surface 3 is formed so that the refractive index gradually changes in the thickness direction due to the minute uneven surface shape, and may prevent the reflection of the incident light in a broad wavelength band by the principle of a moth eye structure. An acrylate ultraviolet curable resin may be favorably used as the curable base 4 for molding that forms the anti-reflection surface 3. Furthermore, the present invention is not limited thereto, and various materials and various curable resins such as ultraviolet curable epoxy and polyester resins, electron-ray curable acrylate, epoxy, and polyester resins, or thermosetting urethane, epoxy and polysiloxane resins may be used. Moreover, other thermoplastic resins may be also used by a heating and pressurizing molding process.

The anti-reflection article 1 is characterized in that the uneven surface shape of the anti-reflection surface 3 thereof is different to the surface shape of the anti-reflection surface of the conventional anti-reflection article. The uneven surface shape of the anti-reflection surface 3 of the anti-reflection article 1 is a shape in which the minute concave portion of the uneven surface shape of the anti-reflection surface of the conventionally existing anti-reflection article is inverted to the minute convex portion.

More specifically, in order to improve the abrasion resistance, the anti-reflection article 1 is characterized in that the uneven surface shape of the anti-reflection surface 3 thereof is a surface shape in which the uneven surface shape of the existing anti-reflection article, which is characterized by forming at least a part of the minute convex portions forming the uneven surface shape to have multiple peaks, is reversed. In such an anti-reflection article 1, at least a part of the minute concave portions forming the uneven surface shape is a minute concave portion having multiple lowermost points in the minute concave portion.

In other words, the uneven surface shape of the anti-reflection surface 3 of the anti-reflection article 1 can be manufactured as an anti-reflection article manufacturing mold plate for molding an uneven surface shape in the anti-reflection surface 3 by using the above-described anti-reflection article with excellent abrasion resistance as a mold plate. As described above, since a mold plate having a surface shape with excellent abrasion resistance can be used as an anti-reflection article manufacturing mold plate, the anti-reflection article 1 is excellent in terms of productivity as exchange or maintenance costs of the mold plate can be reduced. Moreover, even in the case when the anti-reflection article 1 of the present invention is manufactured by using another mold plate having the same surface shape as that of the above-described anti-reflection article with excellent abrasion resistance, similarly, the exchange or maintenance costs of the mold plate can be reduced.

Next, details of the uneven surface shape of the anti-reflection article of the present invention and an anti-reflection article manufacturing mold plate 5 corresponding to each surface shape thereof will be described. In order to facilitate understanding, first, a method of manufacturing an anti-reflection article by using a mold plate will be simply described. Subsequently, details of the uneven surface shape will be described.

Figure 2:
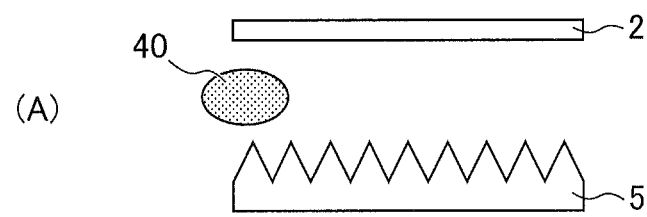
FIG. 2 is a diagram that is provided to describe the general manufacturing process of manufacturing the anti-reflection article by using an anti-reflection article manufacturing mold plate.
Figure 2:
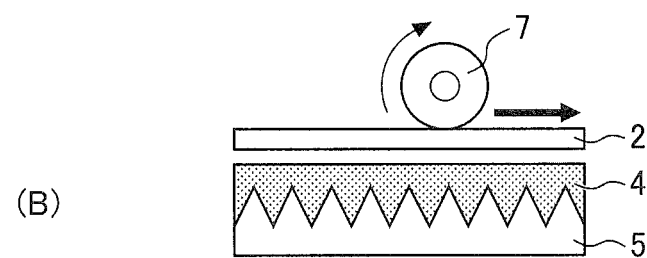
Figure 2:
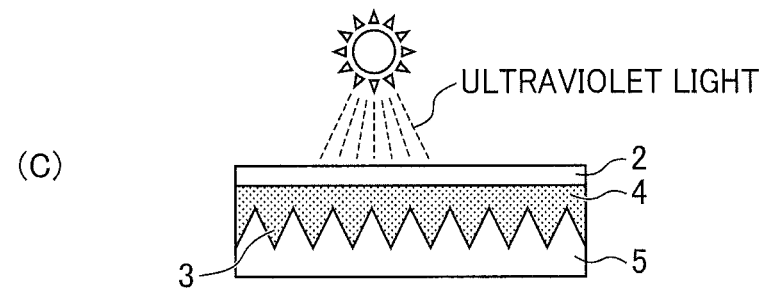
Figure 2:
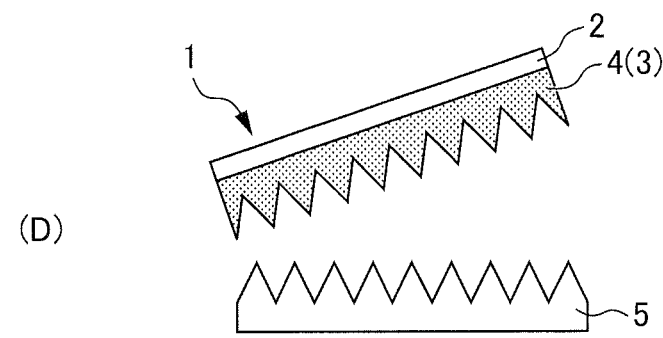

FIG. 2 is a conceptual diagram schematically illustrating a manufacturing process for manufacturing the anti-reflection article using a mold plate. In the manufacturing process, a curable base 4 is first applied to the base 2 with a die (not illustrated) (A). Furthermore, the application of the curable base 4 is not limited to the case of using the die, and various methods may be employed. Subsequently, the anti-reflection article manufacturing mold plate 5 and the base 2 are pressurized by a pressure roller 7 so that the curable base 4 adheres to the base 2 and the curable base 4 is sufficiently charged into the minute concave portions formed on the surface of the anti-reflection article manufacturing mold plate 5 (B). In this state, the curable base 4 is cured by the irradiation of ultraviolet light, so that the anti-reflection surface 3 is formed (C). Subsequently, the base 2 is peeled off the anti-reflection article manufacturing mold plate 5 through a peeling roller (not illustrated) (D).

In many cases, a mold may be used as a general mold plate in which a minute uneven surface shape having a repetition period equal to a visible light wavelength or less is formed on the peripheral surface of a metallic base material by using aluminum anodization. A method of manufacturing the mold is conventionally known, but by further appropriately optimizing various conditions of the anodization when the mold is manufactured by the method, it is possible to form the minute convex portion in the anti-reflection surface with excellent abrasion resistance as described above.

In the anti-reflection article 1, when the anti-reflection article provided with the anti-reflection surface with excellent abrasion resistance thus manufactured is used as the anti-reflection article manufacturing mold plate 5, as described above, the uneven surface shape of the anti-reflection surface 3 can be formed as the uneven surface shape in which the minute concave portion and the minute convex portion of the existing anti-reflection article with excellent abrasion resistance are reversed. In this case, although the anti-reflection article manufacturing mold plate 5 is made of resin, the anti-reflection article manufacturing mold plate 5 is excellent in terms of abrasion resistance compared to a conventional product. Therefore, the durable life of the plate is long and thus it can sufficiently contribute to reducing manufacturing costs.

Moreover, as described below with reference to a specific example, in the existing anti-reflection article with excellent abrasion resistance, when the convex portion and the concave portion of the surface shape are reversed, the light beam reflectance is merely increased in the range of between 0 to 45%. It is found that the light beam reflectance can be set to a range in which there is generally no practical problem in terms of optical characteristics. Furthermore, the light beam reflectance in this specification means a value (reflectance) obtained by subtracting SCE (specular component excluded-reflectance) from SCI (specular component included-reflectance).

Hereinafter, a combination of the anti-reflection article of the present invention, the uneven surface shape of the anti-reflection surface, and the anti-reflection article manufacturing mold plate with excellent abrasion resistance that can be used as an anti-reflection article manufacturing mold plate for molding the corresponding uneven surface shape will be described.

Figure 3A:
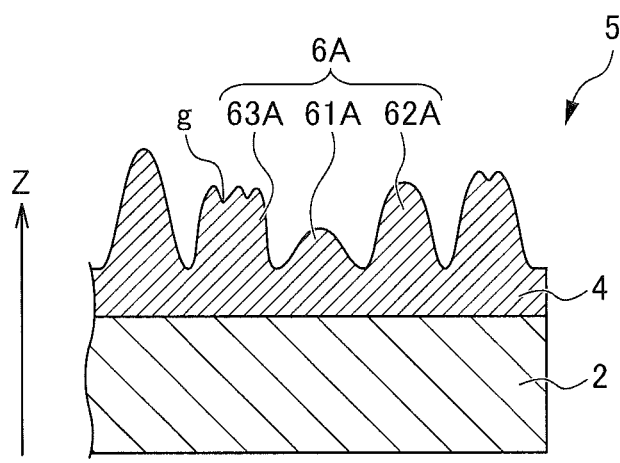
FIG. 3A is a schematic diagram that is provided to describe a mold plate for manufacturing the anti-reflection article according to an embodiment of the present invention.
Figure 3B:
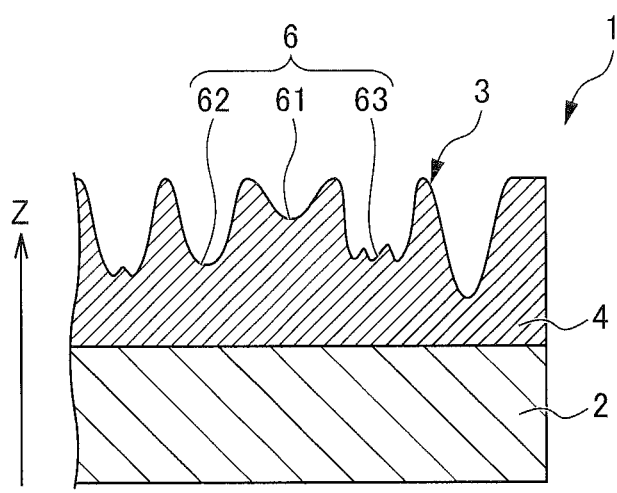
FIG. 3B is a schematic diagram that is provided to describe the anti-reflection article according to the embodiment of the present invention.

As illustrated in FIG. 3B, in the anti-reflection article 1 of the present invention, minute concave portions 61, 62, and 63 are densely arranged and the gap between the adjacent minute concave portions is the shortest wavelength of a wavelength band or less of an electromagnetic wave for anti-reflection. As in the minute concave portion 63, at least some of the minute concave portions are a multi-groove minute concave portion with multiple lowermost points in the minute concave portion.

Here, the anti-reflection article 1 having the anti-reflection surface 3 with the uneven surface shape as illustrated in FIG. 3B can be manufactured by using the anti-reflection article manufacturing mold plate 5 illustrated in FIG. 3A. In the anti-reflection article manufacturing mold plate 5, minute convex portions 61A, 62A, and 63A are densely arranged and the gap between the adjacent minute convex portions is the shortest wavelength of a wavelength band or less of an electromagnetic wave for anti-reflection in the anti-reflection article 1. At least some of the minute convex portions are formed as a multi-peak minute convex portion with multiple peaks as in the minute convex portion 63A.

Here, the anti-reflection article manufacturing mold plate 5 illustrated in FIG. 3A has the multi-peak minute convex portion 63A. In the multi-peak minute convex portion 63A, the thickness of the hemline portion with respect to the dimension of the vicinity of the peak is relatively thickened compared to the single-peak minute convex portions 61A and 62A. Accordingly, it is possible to mention that the multi-peak minute convex portion has an excellent mechanical strength compared to the single-peak minute convex portion. Specifically, when an external force is applied to the anti-reflection article, the external force is dispersed and received by multiple peaks compared to the case of only the single-peak minute convex portion, so that the external force applied to the respective peaks may be reduced and the minute convex portion is not easily damaged. Accordingly, the local degradation of the uneven surface shape pattern can be reduced. Therefore, the anti-reflection article manufacturing mold plate 5 in which the multi-peak minute convex portion with multiple peaks is present is excellent in terms of abrasion resistance compared to the case of only the single-peak minute convex portion.

Moreover, in the anti-reflection article 1 of the present invention, it is preferable that the standard deviation of the depths of the minute concave portions 61, 62, and 63 vary in the range of 10 nm or more and 50 nm or less. According to this, in the anti-reflection article manufacturing mold plate 5, the effect in which the above-described external force can be dispersed and received by many more peaks becomes significant and the abrasion resistance of the anti-reflection article manufacturing mold plate 5 becomes much better.

Furthermore, in the anti-reflection article 1 of the present invention, as illustrated in FIG. 3B, at least some of the minute concave portions 61, 62, and 63 preferably form an annular minute concave portion group 6 which is formed by an inner-core minute concave portion 61 and a plurality of outer-edge minute concave portions 62 and 63 that are formed by surrounding the circumference of the inner-core minute concave portion 61 and have a deeper depth than that of the inner-core minute concave portion 61.

The anti-reflection article 1 having the anti-reflection surface 3 formed by the uneven surface shape including the annular minute concave portion group 6 illustrated in FIG. 3B can be manufactured by using the anti-reflection article manufacturing mold plate 5 illustrated in FIG. 3A. In the anti-reflection article manufacturing mold plate 5, at least some of the minute convex portions 61A, 62A, and 63A form an annular minute convex portion group 6A which is formed by the inner-core minute convex portion 61A and a plurality of outer-edge minute convex portions 62A and 63A that are formed by surrounding the circumference of the inner-core minute convex portion 61A and have a higher height than that of the inner-core minute convex portion 61A.

In the annular minute convex portion group 6A formed by a plurality of minute convex portions having various heights different to one another as in the annular minute convex portion group 6A in the anti-reflection article manufacturing mold plate 5 illustrated in FIG. 3A, for example, even in a case where the shape of the outer-edge minute convex portion 62A having a high height is damaged by contact with an object, the shape of the inner-core minute convex portion 61A having a low height is maintained. When such an annular minute convex portion group 6A is formed, the abrasion resistance can be improved in the anti-reflection article manufacturing mold plate 5 illustrated in FIG. 3A. Incidentally, the proportion of the minute concave portions forming the annular minute concave portion group 6 among the minute concave portions is preferably 7% or higher. According to this, the effect of improving the abrasion resistance of the anti-reflection article manufacturing mold plate 5 is exhibited more stably.

Figure 4A:
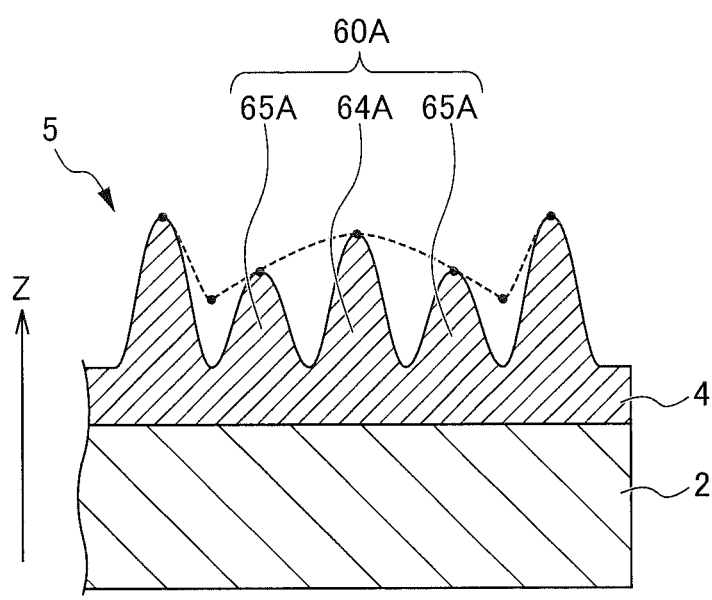
FIG. 4A is a schematic diagram that is provided to describe the mold plate for manufacturing the anti-reflection article according to the embodiment of the present invention.
Figure 4B:
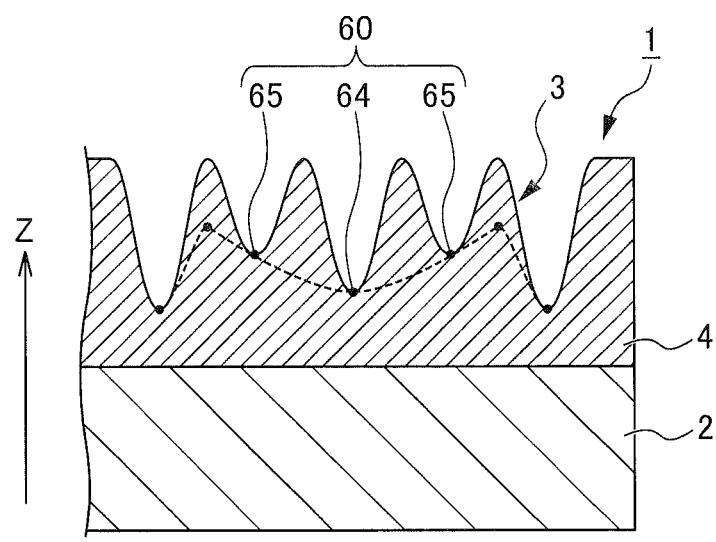
FIG. 4B is a schematic diagram that is provided to describe the anti-reflection article according to the embodiment of the present invention.

Alternatively, in the anti-reflection article 1 of the present invention, as illustrated in FIG. 4B, at least some of the minute concave portions 64 and 65 preferably form an earthenware mortar-shaped minute concave portion group 60 which is formed by one central minute concave portion 64 and a plurality of peripheral minute concave portions 65 that are formed adjacent to the circumference of the central minute concave portion 64 and have a shallower depth than that of the central minute concave portion 64.

Here, the anti-reflection article 1 having the anti-reflection surface 3 formed by the uneven surface shape including the earthenware mortar-shaped minute concave portion group 60 illustrated in FIG. 4B can be manufactured by using the anti-reflection article manufacturing mold plate 5 illustrated in FIG. 4A. In the anti-reflection article manufacturing mold plate 5, at least some of the minute convex portions 64A and 65A form a bell-shaped minute convex portion group 60A which is formed by the central minute convex portion 64A and a plurality of peripheral minute convex portions 65A that are formed by surrounding the circumference of the central minute convex portion 64A and have a lower height than that of the central minute convex portion 64A.

In the bell-shaped minute convex portion group 60A formed by a plurality of minute convex portions having various heights different to one another as in the bell-shaped minute convex portion group 60A in the anti-reflection article manufacturing mold plate 5 illustrated in FIG. 4A, for example, even in the case when the shape of the central minute convex portion 64A having a high height is damaged by contact with an object, the shape of the peripheral minute convex portion 65A having a low height is maintained. When such a bell-shaped minute convex portion group 60A is formed, the abrasion resistance can be improved in the anti-reflection article manufacturing mold plate 5 illustrated in FIG. 4A. Incidentally, the proportion of the minute concave portion forming the earthenware mortar-shaped minute concave portion group 60 among the minute concave portions is preferably 10% or higher. According to this, the effect of improving the abrasion resistance of the anti-reflection article manufacturing mold plate 5 is exhibited more stably.

Figure 5:
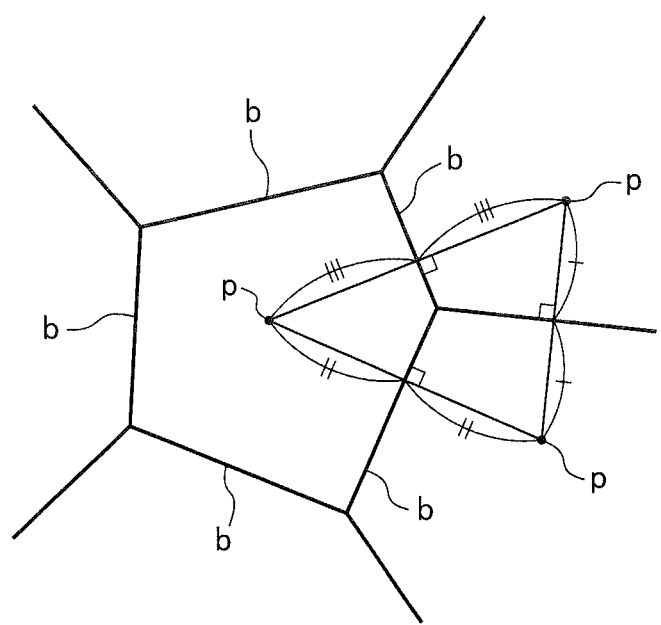
FIG. 5 is a diagram that is provided to describe a Voronoi tessellation line.

Furthermore, in the anti-reflection article 1 of the present invention, it is preferable that at least some of the minute concave portions be arranged in a non-matrix form in their entirety in planar view and, as illustrated in FIG. 5, a predetermined proportion or more of the minute concave portions be arranged to form a Voronoi tessellation line b using the lowermost point p of each minute concave portion as the generating point.

(Hereinafter, in this specification, such an arrangement is also referred to as a "Voronoi arrangement".) Incidentally, as illustrated in FIG. 5, the Voronoi tessellation means the division of the planar surface by a net-like diagram which is constituted by a closed polygonal aggregate fractionated by both Voronoi tessellation lines b that are perpendicular bisectors of a line segment connecting respective adjacent generating points that are the lowermost points p of respective minute concave portions. The net-like diagram obtained by the Voronoi tessellation is a Voronoi diagram and each closed area is a Voronoi cell. In addition, the point that is a starting point of each Voronoi tessellation line and an apex of the polygon constituting each Voronoi cell is referred to as a Voronoi branch point.

Here, the anti-reflection article 1 in which the minute concave portions are arranged in a non-matrix form in their entirety in planar view and at least some thereof are arranged along the Voronoi arrangement can be manufactured by using the anti-reflection article manufacturing mold plate 5 in which some of the minute convex portions are arranged along the Voronoi arrangement in the same manner. Both of the anti-reflection article 1 and the anti-reflection article manufacturing mold plate 5 in which at least some of the uneven surface shapes are arranged along the Voronoi arrangement are excellent in terms of abrasion resistance because of the following reasons.

Since the anti-reflection article 1 and the anti-reflection article manufacturing mold plate 5 in which the minute concave portions or the minute convex portions are arranged in a non-matrix form in planar view do not have ridge portions or protrusions such as convex portions formed in the circumference of the minute concave portion at a certain period on a line of action of force applied to the uneven surface shape portion compared to the anti-reflection article or the like in which the minute concave portions or the minute convex portions are arranged in a matrix form, there is no case when the force from an exterior object is continuously applied to the protrusions on the same line of action. Therefore, even in the case when the external force destroys the protrusion to first come into contact with it, there is no case where the protrusions on the line of action are continuously destroyed. As a result, in the anti-reflection article 1 and the anti-reflection article manufacturing mold plate 5 having the same uneven surface shape as described above, damage to the uneven surface shape portion due to the external force occurs with difficulty. Moreover, even when the uneven surface shape portion is locally destroyed due to the external force, such destruction merely occurs locally. According to this, the above-described anti-reflection article 1 and the anti-reflection article manufacturing mold plate 5 in which the minute concave portions or the minute convex portions are arranged in a non-matrix form in planar view become excellent in terms of abrasion resistance.

Furthermore, in the case when the minute concave portions or the minute convex portions described above are formed as the Voronoi arrangement, when the average number of the Voronoi tessellation lines each having a Voronoi branch point as a starting point is 3 or more and less than 4, the Voronoi diagram is a diagram different from a square lattice (the average number of the Voronoi tessellation lines is 4), that is a typical two-dimensional periodic lattice, and the arrangement of the minute concave portions or the minute convex portions arranged on generating points of the Voronoi diagram is also different from the periodic arrangement of the square lattice. Therefore, the effects of reducing and alleviating the destruction of the above-described minute concave portion or minute convex portion due to the external force as described above are exhibited more effectively. In particular, in the case when 3<Average Number of Voronoi Tessellation Lines Each having a Voronoi Branch Point as a Basic Point<4, since the Voronoi diagram is also different from a hexagonal lattice (tortoiseshell lattice) and has an arrangement in which the periodic arrangement of the above-described minute concave portion or minute convex portion is further broken, the case is more preferable in view of exhibiting the effect of improving the abrasion resistance of the above-described minute concave portion or minute convex portion.

Moreover, in the anti-reflection article 1, when the minute concave portions are arranged along the Voronoi arrangement and at least some of the net-like parting lines formed by surrounding each minute concave portion on the ridge portion between respective adjacent minute concave portions matches the Voronoi tessellation line, excellent abrasion resistance can be exhibited while a sufficient anti-reflection property is maintained. However, in the case when an area arranged in such a manner is not sufficiently present, needless to say, the effect of improving the abrasion resistance cannot always be exhibited sufficiently. From the above viewpoint, the net-like parting line matches the Voronoi tessellation line preferably on 20% or more of the area of the surface of the anti-reflection article and more preferably on 50% or more of the area thereof.

As described above, the anti-reflection article 1 can be manufactured by using the existing anti-reflection article, which is characterized in that the uneven surface shape of the anti-reflection surface 3 thereof is formed by making at least some of the minute convex portions forming the uneven surface shape have multiple peaks in order to improve the abrasion resistance, as an anti-reflection article for an original plate. The anti-reflection article for an original plate can be manufactured, for example, by changing the manufacturing condition used when a mold for molding is manufactured by a conventionally known anodization method to be in a certain condition range.

As a specific example, minute holes that are used for molding the minute convex portion are formed by repeating an anodization treatment and an etching treatment and the minute holes are dug so as to gradually increase the hole diameters of the minute holes. The multi-peak minute convex portion is formed by a microscopic hole having a concave portion with a shape corresponding to the peak of the related structure. It is considered that such a microscopic hole is manufactured by integrating minute holes, which are extremely closely manufactured, by the etching treatment. According to this, when the gap between the minute holes manufactured by anodization varies to a great extent and the variation in the anodization treatment is increased, a mixed state of the multi-peak minute convex portions and the single-peak minute convex portions can be realized.

Moreover, the variation in the height of the minute hole is caused by a variation in a depth of the minute hole manufactured in the mold and it is possible to mention that such a variation in the depth of the minute hole is caused by the variation in the anodization treatment.

Accordingly, a condition in the anodization treatment is set so as to increase the variation and thus it is possible to produce an anti-reflection article in which minute convex portions having multiple peaks and single-peak minute convex portions are mixed and the heights of the minute convex portions vary.

Here, an applied voltage (formation voltage) in the anodization treatment and the gap between minute holes are in a proportional relationship and as the applied voltage deviates from a certain range, the variation is increased. According to this, it is possible to manufacture a roll plate for producing an anti-reflection article in which minute convex portions having multiple peaks and single-peak minute convex portions are mixed and heights of the minute convex portions vary, by using an aqueous solution of sulfuric acid, oxalic acid, and phosphoric acid having a concentration of from 0.01 M to 0.03 M and applying an applied voltage of 15 V (first step) to 35 V (second step: about 2.3 times the voltage in the first step).

Since the variation in the gap between minute holes is increased when the applied voltage varies, the applied voltage may be varied intentionally, for example, in the case when an applied voltage is generated by using an AC source biased by a DC source. In addition, the anodization treatment may be carried out by using a power source having a large degree of variability in voltage. It is possible to obtain an anti-reflection article for an original plate having the surface shape as illustrated in FIG. 3A from a mold which can be obtained in the above-described manufacturing conditions. When the anti-reflection article for an original plate is used as the anti-reflection article manufacturing mold plate 5, it is possible to manufacture the anti-reflection article 1 illustrated in FIG. 3B.

As for the anti-reflection article 1 thus obtained and the anti-reflection article for an original plate used to manufacture the anti-reflection article 1, when the anti-reflection properties were measured and then compared, it was possible to obtain a result that the degradation of reflective performance was merely about 0 to 45%.

A specific example will be described below. The light beam reflectance of an anti-reflection article (referred to as anti-reflection article a) which was manufactured by using a TAC film as a base, an acrylate ultraviolet curable resin as a curable resin, and a molding plate manufactured under the condition and using the method described in paragraph [0077] was measured. The value of the light beam reflectance was 0.12%. On the other hand, 30 anti-reflection articles (referred to as anti-reflection articles b) having a shape in which the concavo-convex shape of the anti-reflection article a is reversed were manufactured by using the anti-reflection article a as an original plate, that is, a molding plate. The light beam reflectances of the anti-reflection articles b were measured in the same manner as described above. As a result, the light beam reflectances thereof were in the range of between 0.13% to 0.17%. The light beam reflectance of the anti-reflection article b is a sufficient anti-reflection property, for example, in applications which are conventionally applied, compared to various multilayered low reflecting film products which have been used conventionally. From the above, it is found that the anti-reflection article of the present invention is an anti-reflection article having a sufficiently excellent anti-reflection property in practical use. That is, it is verified that the anti-reflection article of the present invention which is manufactured by using an anti-reflection article manufacturing mold plate (an anti-reflection article for an original plate) with excellent abrasion resistance has sufficiently excellent optical characteristics in practical use.

Hereinbefore, as a preferred specific example for carrying out the present invention, various embodiments of the uneven surface shape of the anti-reflection article of the present invention in which the anti-reflection article for an original plate with excellent abrasion resistance is manufactured as an anti-reflection article manufacturing mold plate has been described in detail, but the present invention is not intended to be limited to an anti-reflection article having the above-described uneven surface shape. In the case when an anti-reflection article with excellent abrasion resistance and excellent optical properties is used as an original plate and the uneven shape of the anti-reflection article is reversed, the present invention has a unique technical feature from the viewpoint of benefit to productivity due to the excellent abrasion resistance of the original plate and from the viewpoint of obtaining necessary and sufficient optical properties due to the reversed uneven shape. Based on this point of view, the configuration of the above-described embodiment of the present invention may be modified into various forms and can be also combined with the configuration of the related art as long as an anti-reflection article is manufactured by the method of manufacturing an anti-reflection article of the present invention which includes molding a plurality of minute concave portions in the surface of the curable base by causing the anti-reflection surface of an anti-reflection article of an original plate to come into pressure-contact with the surface of the uncured curable base. Of course, such an anti-reflection article is also included in the scope of the present invention.

Other Embodiments

While the specific configuration of the embodiment of the present invention has been described in detail, the configuration of the above-described embodiment of the present invention may be modified into various forms without departing from the spirit of the present invention and can also be combined with the configuration of the related art.

The anti-reflection article of the present invention may improve visibility while being disposed on the front surfaces of various image display panels such as a liquid crystal display panel, an electroluminescent display panel, a plasma display panel, or the like. Furthermore, the present invention is not limited thereto. For example, the anti-reflection article may be widely applied to the case when the anti-reflection article is disposed on the rear surface of the liquid crystal display panel so as to reduce the reflection loss of the incident light from the backlight to the liquid crystal display panel (the case when the incident light utilization efficiency is improved). Furthermore, the front surface of the image display panel is the image light emission surface of the image display panel and is also the image observer side surface. Furthermore, the rear surface of the image display panel is the surface opposite to the front surface of the image display panel and is also the surface onto which the illumination light is incident from the backlight in the case of the transparent image display device that uses a backlight (a back light source).

Furthermore, in the above-described embodiment, as illustrated in FIG. 1, a double-layer lamination structure has been exemplified in which the anti-reflection surface 3 having a minute uneven shape formed of the curable base 4 is formed on one surface of the base 2. However, the anti-reflection article 1 of the present invention may be a single-layer lamination structure in which the minute concave portion is directly molded on one surface of the base 2 without using any other layer. Alternatively, the anti-reflection article may be a lamination structure with three or more layers obtained by forming the anti-reflection surface 3 on one surface of the base 2 with one or more intermediate layers (layers that improve a base surface property such as adhesiveness between layers, coating suitability, and surface smoothness and are called primary layers or anchor layers).

Moreover, in the above-described embodiment, as illustrated in FIG. 1, the anti-reflection surface 3 is formed on only one surface of the base 2, but the anti-reflection surface 3 may be formed on both surfaces of the base 2. Furthermore, the anti-reflection article 1 may be formed as an attachable article in which various adhesive layers are formed on the surface opposite to the anti-reflection surface 3 and a peelable film (peelable paper) is laminated onto the surface of the adhesive layers so as to be peelable. In such an embodiment, the anti-reflection article 1 of the present invention may be attached and laminated onto a desired surface of a desired article by the adhesive layer after peeling the peelable film so as to expose the adhesive layer. Accordingly, a desired article may simply have an anti-reflection property. As the adhesive, various existing adhesives such as an adhesive (pressure-sensitive adhesive), a two-pack curable adhesive, a UV curable adhesive, a thermosetting adhesive, a hot-melt adhesive, and so on, may be used.

Furthermore, the anti-reflection article 1 may be stored, transported, sold, and post-processed while a peelable protection film is temporarily attached onto the anti-reflection surface 3, and the protection film may be peeled off at an appropriate time later on. In such an embodiment, it is possible to prevent degradation in the anti-reflection property due to the damage or the contamination of the uneven surface portion during storage and transportation.

Furthermore, the anti-reflection article 1 may be applied to various application examples other than the case where the film-shaped anti-reflection article is disposed on the front surface of the image display panel or the illumination light incident surface. Specifically, the anti-reflection article may be applied onto the rear surface (the image display panel side) of a front-surface-side member such as a touch panel provided on the screen of an image display panel with a gap therebetween, various windows, or various optical filters. Furthermore, in this case, there is an effect in which an interference fringe such as a Newton ring formed by the interference of light between the image display panel and the surface-side member is prevented, a ghost image formed by the multi-reflection between the emission surface of the image display panel and the light incident surface of the surface-side member is prevented, and the reflection loss of the image light emitted from the screen and entering the surface-side member is reduced.

Furthermore, the anti-reflection article may be disposed onto the front surface (the external world side) or both surfaces of a front surface and a rear surface (a goods or exhibited object side) of a glass plate used in a show window, a goods display box of a shop, a display window, a goods display box for an exhibited object of a museum, or the like. Furthermore, in this case, it is possible to improve the visibility of an art collection or goods for a tourist or a customer via the anti-light-reflection function of the front surface of the glass plate.

Furthermore, the anti-reflection article may be widely used for the case when the anti-reflection article is applied to the front surface of a prism or a lens used in various optical units such as glasses, a telescope, a camera, a video camera, a gun's sight mirror (sniper's scope), binocular glasses, a periscope, and so on. In this case, it is possible to improve visibility by the anti-light-reflection function of the front surface of the lens or the prism. Furthermore, the anti-reflection article may be also applied in the case when the anti-reflection article is applied to the front surface of a printed portion (including characters, pictures, diagrams and so on) of a book, and may improve the visibility of characters and the like by preventing the light reflection of the front surface of the characters and the like. Furthermore, the anti-reflection article may be also applied to the front surface of a signboard, a poster, and various displays (a direction guide, a map, a no smoking sign, an entrance sign, an emergency exit sign, a restricted area sign, or the like) in various shops, streets, outer walls, and so on, and may improve the visibility thereof. Furthermore, the anti-reflection article may be also applied to the light incident surface of a window material (also serving as a diffuser plate, a light collecting lens, or an optical filter in some cases) of an illumination unit using a white bulb, a light emitting diode, a fluorescent lamp, a mercury lamp, or EL (electroluminescence) lamp or the like. Accordingly, the anti-reflection article may prevent the light reflection of the light incident surface of the window material, may reduce the reflection loss of the light from the light source, and may improve the light utilization efficiency. Furthermore, the anti-reflection article may be also applied to the display window surface (the display observer side) of a clock or various measurement units, and may improve the visibility by preventing the light reflection of the display window surface.

Furthermore, the anti-reflection article may be also applied to the front surface of the indoor side, the outdoor side, or both sides of a control cabin (an operation cabin or a steering cabin) of a conveyance such as an automobile, a railroad vehicle, a ship, an airplane or the like, and may improve the visibility of the controller (the operator or a steering person) to the external world via the anti-reflection of the indoor external light from the window. Furthermore, the anti-reflection article may also be applied onto the front surface of a window or a lens of a night-vision device used for a security monitoring operation, the focusing operation of a gun, an astronomical observing operation or the like, and may improve visibility at night time or in a dark place.

Furthermore, the anti-reflection article may also be applied onto the front surface (the indoor side, the outdoor side, or both sides) of a transparent substrate (a window glass or the like) forming a window, a door, a partition, or a wall surface of a building such as a house, a shop, an office, a school, a hospital or the like, and may improve external world visibility or daylight efficiency. Furthermore, the anti-reflection article may also be applied onto the front surface of a transparent sheet or a transparent plate (window material) of a greenhouse or an agricultural vinyl greenhouse, and thus, may improve the daylight efficiency of the sunlight. Furthermore, the anti-reflection article may also be applied onto the front surface of a solar cell, and may improve the utilization efficiency (generation efficiency) of sunlight.

In the above-described various embodiments, in the case when the film-shaped anti-reflection article of the present invention is applied onto the front surface, the rear surface, or both surfaces of the transparent substrate such as a glass plate, the anti-reflection article may be also applied onto only a partial area instead of applying or coating the anti-reflection article onto the entire surface of the transparent substrate. As such an example, for example, the film-shaped anti-reflection article may be applied to only the indoor side surface in a square area of a center portion in one window glass, and the anti-reflection article is not applied to other areas. In the case when the anti-reflection article is applied to only a partial area of the transparent substrate, it is easy to visually recognize the existence of the transparent substrate even when a particular display or a collision prevention object is not provided. Accordingly, it is possible to obtain an effect of suppressing the risk of a person being injured by collision with the transparent substrate and an effect of simultaneously preventing an indoor (interior) visible state and realizing a visible state (in the area provided with the anti-reflection article) of the transparent substrate.

The invention claimed is:

1. An anti-reflection article in which minute concave portions are densely arranged and a gap between the adjacent minute concave portions is the shortest wavelength of a wavelength band or less of an electromagnetic wave for anti-reflection,
wherein the minute concave portion is a microscopic hole, a standard deviation of depths of the minute concave portions varying in a range from 10 nm to 50 nm,
wherein a plurality of grooves are formed in one of the minute concave portions so that the minute concave portion with the plurality of grooves and the minute concave portion with one lowermost point are mixed,
wherein the minute concave portions are arranged in a non-matrix form in planar view,
wherein, in at least a partial area of the anti-reflection article, a net-like parting line which surrounds each minute concave portion is formed, the net-like parting line being formed on a ridge portion between respective adjacent minute concave portions, the net-like parting line matching a Voronoi tessellation line having a centroid point on each minute concave portion in planar view as a generating point, and
wherein an earthenware mortar-shaped concave portion group is formed by (i) a central minute concave portion and (ii) a plurality of peripheral minute concave portions, each of the plurality of peripheral minute concave portions being formed adjacent to the central minute concave portion such that the plurality of peripheral minute concave portions surround the central minute concave portion, the plurality of peripheral minute concave portions having a substantially same depth that is shallower than a depth of the central minute concave portion.

2. The anti-reflection article according to claim 1, wherein at least some of the minute concave portions form an annular minute concave portion group which is formed by an inner-core minute concave portion and a plurality of outer-edge minute concave portions that are formed by surrounding the circumference of the inner-core minute concave portion and have a deeper depth than that of the inner-core minute concave portion.

3. The anti-reflection article according to claim 2, wherein a proportion of the minute concave portions forming the annular minute concave portion group among the minute concave portions is 7% or higher.

4. The anti-reflection article according to claim 1, wherein a proportion of the minute concave portions forming the earthenware mortar-shaped minute concave portion group among the minute concave portions is 10% or higher.

5. The anti-reflection article according to claim 1, wherein, in 20% or more of an area on a surface of the anti-reflection article, the net-like parting line matches the Voronoi tessellation line.

6. The anti-reflection article according to claim 1, wherein, in the net-like parting line matching the Voronoi tessellation line, an average number of the Voronoi tessellation lines each having a Voronoi branch point as a starting point is 3 or more and less than 4.

7. An anti-reflection article manufacturing mold plate in which minute convex portions corresponding to the minute concave portions of the anti-reflection article according to claim 1 are formed.

8. An image display apparatus in which the anti-reflection article according to claim 1 is applied onto a light emission surface of an image display panel.

9. A method of manufacturing the anti-reflection article according to claim 1, the method comprising:
molding a plurality of minute concave portions in a surface of a curable base by causing an anti-reflection surface of an anti-reflection article for an original plate which is provided with the anti-reflection surface formed by densely arranging minute convex portions on a transparent base to come into pressure-contact with the surface of the uncured curable base;
curing the uncured curable base in which the minute concave portion is molded; and
causing the anti-reflection article for the an original plate to be peeled off from the curable base.

10. The anti-reflection article according to claim 1, further comprising a plurality of outer minute concave portions, each of the plurality of outer minute concave portions being formed adjacent to each of the plurality of peripheral minute concave portions such that the plurality of outer minute concave portions surround the plurality of peripheral minute concave portions, wherein each of the plurality of outer minute concave portions has a depth that is deeper than the depth of the central minute concave portion.

11. The anti-reflection article according to claim 1, wherein a plurality of minute convex portions formed by the central minute concave portion and each of the plurality of peripheral minute concave portions have a substantially same height.

12. An anti-reflection article in which minute concave portions are densely arranged and a gap between the adjacent minute concave portions is the shortest wavelength of a wavelength band or less of an electromagnetic wave for anti-reflection,
   wherein the minute concave portion is a microscopic hole,
   a standard deviation of depths of the minute concave portions varying in a range from 10 nm to 50 nm,
   wherein a plurality of grooves are formed in one of the minute concave portions so that the minute concave portion with the plurality of grooves and the minute concave portion with one lowermost point are mixed,
   wherein the minute concave portions are arranged in a non-matrix form in planar view,
   wherein, in a partial area of the anti-reflection article, a net-like parting line which surrounds each minute concave portion is formed, the net-like parting line being formed on a ridge portion between respective adjacent minute concave portions, the net-like parting line matching a Voronoi tessellation line having a centroid point on each minute concave portion in planar view as a generating point, and
   wherein an annular minute concave portion group is formed by (i) an inner-core minute concave portion having a first depth and (ii) a plurality of outer-edge concave portions, each of the plurality of outer-edge concave portions being located adjacent to the inner-core minute concave portion such that the plurality of outer-edge concave portions surround the inner-core minute concave portion, each of the plurality of outer-edge minute concave portions having a second depth that is deeper than the first depth, and at least one of the plurality of outer-edge minute concave portions having a plurality of grooves.

* * * * *